Patented May 20, 1952

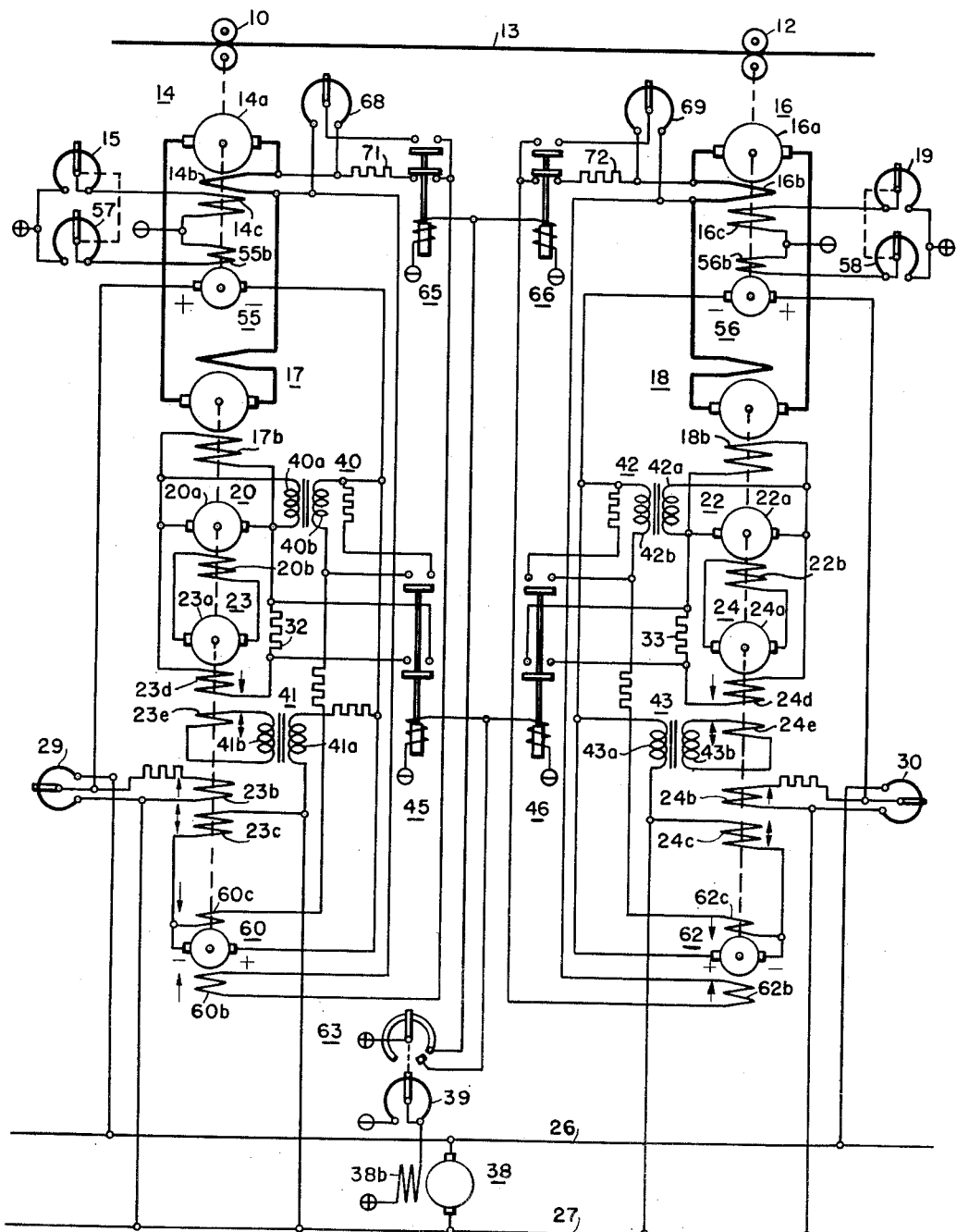

2,597,095

UNITED STATES PATENT OFFICE 2,597,095

MOTOR CONTROL SYSTEM

Edwin L. Harder, Loren F. Stringer, and Raymond W. Moore, Pittsburgh, Pa., and Robert I. Greenwood, Montrose, Calif., assignors to Westinghouse Electric Corporation, East Pittsburgh, Pa., a corporation of Pennsylvania Application June 29, 1950, Serial No. 171,138

9 Claims. (Cl. 318—72)

Our invention relates generally to motor control systems and has reference in particular to speed regulating control systems such as may be used to control the several roll stand motors of a tandem mill or the like.

Generally stated, it is an object of our invention to provide a control system for motors which is simple and inexpensive to manufacture, and is reliable and effective in operation.

More specifically it is an object of our invention to provide, in a control system for a plurality of roll stand motors in a tandem mill, for regulating the speeds of the several motors relative to each other by matching the output voltages of pilot generators coupled with the respective motors against a common reference voltage.

Another object of our invention is to provide, in a control system for a plurality of roll stand motors in a tandem mill, for utilizing a regulating system having a regulating action which is independent of the motor field conditions.

Yet another object of our invention is to provide, in a speed regulating system for a plurality of roll stand motors, for adjusting the excitation of a pilot generator coupled with each motor in accordance with a change of motor speed by field control so as to maintain a substantially constant gain system.

It is also an important object of our invention to provide, in a speed regulating system for a motor, for utilizing a load exciter in circuit with a regulating field winding of a regulating generator controlling the supply of electrical energy to the motor and for adjusting the output voltage of the load exciter in accordance with the rate of change of voltage applied to the motor.

A further object of our invention is to provide, in a motor control system, for utilizing a speed droop or load exciter in the regulating circuit of a regulating generator controlling the motor, and providing the load exciter with a differential field winding for reducing the effective time constant of the load exciter.

Other objects will in part be obvious, and will in part be explained hereinafter.

In practicing our invention in accordance with one of its embodiments, the armatures of several roll stand motors of a tandem mill are individually supplied with electrical energy from separate main generators, each of which is controlled by a main exciter under the control of a regulating generator. The basic excitation of the regulating generators is supplied from a common adjustable voltage reference bus, while control excitation is supplied by connecting a control field winding to the reference bus and to a pilot generator driven by the respective motor in opposed relations. Field excitation of the pilot generator is adjusted with that of the mill motor so as to provide a constant gain system. A speed droop or load exciter responsive to the armature current of the roll stand or mill motor is connected in circuit with the control field winding and has a differential field winding into which is introduced a voltage proportional to the rate of change of voltage of the main exciter. A degenerative or differential field winding on the regulating generator has its excitation increased during emergency stops so as to reduce the stiffness of the system.

For a more complete understanding of the nature and scope of our invention, reference may be made to the following detailed description, which may be read in connection with the accompanying drawing in which the single figure is a diagrammatic view of a control system embodying the invention in one of its forms.

Referring to the drawing, the reference numerals 10 and 12 may denote, generally, two of the several roll stands of a tandem mill operating on a strip of material 13. The roll stands 10 and 12 may be driven in the usual manner by main or mill motors 14 and 16 having armatures 14a, 16a, series field windings 14b, 16b and separately-excited field windings 14c and 16c, respectively. The field windings 14c and 16c may be energized from a suitable source of electrical energy through field rheostats 15 and 19, respectively.

Electrical energy may be supplied to the armatures 14a and 16a by means of separate generators 17 and 18, individual to the mill motors 14 and 16, respectively. The generators 17 and 18 may be provided with field windings 17b and 18b which may be supplied with electrical energy from main exciters 20 and 22 having field windings 20b and 22b, respectively.

Energization of the field windings 20b and 22b may be provided by means of regulating generators 23 and 24 having armatures 23a and 24a, basic excitation field windings 23b and 24b, control field windings 23c and 24c, anti-hunt field windings 23d and 24d, and damping field windings 23e and 24e, respectively.

The basic excitation field windings 23b and 24b may be connected to a suitable source of reference voltage such as the reference generator 38, by means of reference bus conductors 26 and 27, through potentiometer devices 29 and 30. The voltage of the reference generator 38 may be adjusted in any well known manner, by means such as the field rheostat 39, which may be connected in circuit with field winding 38b of the reference generator.

Regulation of the speeds of the mill motors 14 and 16 may be obtained by connecting the control field windings 23c and 24c of the regulating generators to the reference bus conductors 26 and 27 through potentiometers 29 and 30 and to pilot generators 55 and 56 which may be driven by the motors 14 and 16, respectively. By connecting these field windings 23d and 24d to the reference bus conductors and to the pilot generators in opposite senses, these windings will be energized in accordance with the amounts of any differentials between the output voltages of their respective pilot generators and the voltages derived from reference bus, and with polarities corresponding to the polarities of said differentials.

Field windings 55b and 56b of the pilot generators 55 and 56 may be connected to a suitable source of electrical energy through field rheostats 57 and 58, respectively. By connecting the field rheostats 57 and 58 in operative relation with corresponding field rheostats 15 and 19 of the motors 14 and 16, a constant gain system may be provided, since if the mill motor speed is increased by weakening its field, the field of the corresponding pilot generator is weakened proportionately and the output voltage of the pilot generator remains constant. This provides a regulating action during both the steady state and transient conditions, which is independent of the mill motor field setting, thus enabling more accurate adjustment of the motor speeds, so as to obtain more nearly equal speed matching between the different roll stands.

The anti-hunt field winding 23d and 24d of the regulating generators may be connected across the armatures 20a and 22a of the main exciters 20 and 22, respectively, in circuit with control resistors 32 and 33 in differential senses.

The damping field windings 23e and 24e of the regulating generator may be connected in series circuit relation with the secondary windings 41b and 43b of damping transformers 41 and 43, having primary windings 41a and 43a connected to the reference bus conductors 26 and 27 and the pilot generators 55 and 56 in opposed senses so as to be energized in proportion to the rate of change of differentials therebetween.

Exciters 60 and 62, in the nature of load or load droop exciters, may be connected in series circuit with the control field windings 23c and 24c, respectively, of the regulating generators for generating voltages proportional to the armature currents of the mill motors 14 and 16, respectively. The polarities of the load exciters 60 and 62 may be the same as that of their corresponding pilot generators 55 and 56, so that for a given value of mill motor current and field condition and an adjustable reference voltage, the mill speed will be less than the speed corresponding to the reference voltage by a constant amount, thus providing a constant speed droop over the speed range of the reference voltage. For a given value of armature voltage and current condition, and a variable motor field, the mill speed will be less than the speed corresponding to the reference voltage by a constant percentage, since the voltage of the pilot generator remains constant for different values of field excitation. This gives constant percent droop over the range of speed obtained by varying the motor field excitation.

The load exciters 60 and 62 may be provided with current field excitation windings 60b and 62b connected across the series field windings 14b and 16b of their respective mill motors. Differential field windings 60c and 62c may be provided which are connected to be energized in accordance with the output voltages of the load exciters. Damping transformers 40 and 42 may be provided, having primary windings 40a and 42a connected across the armatures of the main exciters 20 and 22, respectively. The secondary windings 40b and 42b may be connected in series circuit with the differential field windings 60c and 62c, respectively.

In order to achieve a smooth stop of the mill under emergency stop conditions, the gain of the regulating system may be reduced by short circuiting the control resistors 32 and 33, thus increasing the degenerative effects of the differential field windings 23d and 24d of the regulating generators. This may be accomplished by using control relays 45 and 46 which may be energized by a limit switch 63 operatively connected to the field rheostat 39 of the reference voltage generator 38, so as to complete an operating circuit for these control relays when the field rheostat 39 is operated to the minimum voltage position. The control relays 45 and 46 may also be utilized to provide shunt circuits across the secondary windings 40b and 42b of the damping transformers 40 and 42, respectively, so as to reduce their effectiveness accordingly.

To further reduce the tendency of the mill motors 14 and 16 to rock or creep as a result of the main generator residuals, the gain of the load exciters 60 and 62 may be greatly increased when the reference voltage is reduced to zero. This may be accomplished by utilizing control relays 65 and 66, which may be normally energized through the limit switch 63 so as to connect the current field windings 60b and 62b of the load exciters to the series field windings 14b and 16b through voltage dividing potentiometer devices 68 and 69, respectively. When the field rheostat 39 is operated to the minimum voltage position, the control relays 65 and 66 will be deenergized, and return to the deenergized position, thereby connecting the current field windings 60b and 62b across the series field windings 14b and 16b through current limiting resistors 71 and 72, respectively, so as to greatly increase their effectiveness.

In operation, the basic excitation of the regulating generators 23 and 24 is provided by the basic excitation field windings 23b and 24b, respectively, which are energized in accordance with the voltage of the reference bus to maintain the speeds of the motors 14 and 16 at such values that the output voltages of their respective pilot generators substantially equal the reference bus voltage. In practice it has been found desirable, however, to have the voltage of the generator 18 slightly higher, so that the control field winding 24c is actually slightly differential with respect to field winding 24b. This excitation will be modified by the M. M. F. of the control field windings 23c and 24c, which varies, depending on the value and direction of any differential existing between the voltages of the pilot generators 55 and 56 and the voltages from the reference bus conductors.

Accordingly, the regulating generators operate to adjust the voltages of the main generators 17 and 18 to maintain predetermined relations between the voltages of the pilot generators and the reference voltage. Any change of voltage of the main exciters produces an output voltage in the secondary winding of the damping transformers 40 and 42, which is applied to the load exciters 60 and 62 in such direction as to assist in correcting the change. Any variation between the voltage of the reference bus conductors and the voltage of the pilot generator 55, for example, produces a voltage in the secondary winding 41b of the damping transformer 41, which is proportional to the rate of change of the differential and in a direction to neutralize the change.

Since the field rheostat 57 of the pilot generator 55 is operatively connected to the field rheostat 15 of the mill motor 14, any change in the speed of the motor 14 obtained by operation of its field rheostat 15, will be automatically compensated for by a corresponding movement of the field rheostat 57, whereby the output voltage of the pilot generator remains the same as before. Hence, for a given value of motor current and a given field condition of the mill motor 14, and an adjustable reference voltage, the mill speed will be less than the speed corresponding to the reference voltage by a constant amount, determined by the output voltage of the load exciter 60. For any change of motor speed obtained by operating the field rheostat 15, the speed of the mill will be less than the speed corresponding to the reference voltage by a constant percentage, and not a constant amount, since the pilot generator voltage remains constant due to the interconnection of the field rheostats 57 and 15, while the speed of the motor 14 changes.

When the mill is brought to a stop by operating the field rheostat 39 of the reference voltage generator 38 to the minimum voltage position, control relays 65 and 66 will be deenergized so as to greatly increase the energization of the current field windings 60b and 62b of the load exciters thus increasing the gain of the load exciters. At the same time, the control relays 45 and 46 will be energized to reduce the gain of the regulating generators 23 and 24 by increasing the energization of their differential field windings 23d and 24d, respectively. Likewise, the effectiveness of the damping transformer 40 and 42 will be greatly reduced since their secondary windings 40b and 42b are substantially shunted by the control relays 45 and 46.

From the above description and the accompanying drawing, it will be apparent that we have provided a regulating system for tandem mills and the like which has a relatively high rate of response without any substantial overshoot. Such a regulating system is highly effective in maintaining very close regulation between adjacent roll stands of tandem mills such as is necessary for satisfactory operation at the present day high speeds. A regulating system embodying the features of our invention is highly effective in matching the speeds of the several mill stands over a wide range of operating speeds without imposing undesirable stresses on the material being rolled. Such a system also operates in a highly satisfactory manner to bring the mill to a smooth stop at its maximum rate of speed when this is necessary, as during an emergency stop. Any tendency of the mill to creep or rock is completely obviated by utilizing the regulating generators to regulate in affect for zero mill motor current when the reference voltage reaches zero.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system for a plurality of roll stand motors of a tandem mill wherein each roll stand works on a continuous strip of material comprising, a main generator individual to each motor connected to supply electrical energy thereto, a main exciter individual to each main generator connected to supply field excitation thereto, a regulating generator individual to each main exciter, said regulating generators being connected to supply field excitation to their respective main exciters and each regulating generator having a plurality of field windings, a pilot generator connected in driving relation with each roll stand motor, circuit means connecting one of the field windings of each regulating generator to a common source of adjustable reference voltage, control means operable to adjust the reference voltage, additional circuit means connecting another one of the field windings of each regulating generator to said source and the pilot generator associated with its respective roll stand motor in opposed relation, a load exciter having one field winding responsive to the armature current of each roll stand motor connected in circuit with the other field winding of its respective regulating generator and also having a differential field winding, a plurality of damping transformers connected one in circuit with the differential field winding of each load exciter to produce a voltage proportional to the rate of change of main exciter voltage, and switch means operable in response to operation of the control means to a minimum reference voltage position to render the damping transformer ineffective.

2. In a control system for a plurality of roll stand motors in a tandem strip mill wherein all of the roll stands operate on a continuous strip of material, a main generator individual to each roll motor, regulating means individual to each main generator including a main exciter and a regulating generator controlling said exciter, said regulating generator having a plurality of field windings, a pilot generator individual to each roll motor, circuit means connecting one of the field windings of each regulating generator to a common source of reference voltage having control means operable to adjust the reference voltage, circuit means connecting another of the windings of each regulating generator to the common source and to the pilot generator of its respective roll motor in opposed senses, a load exciter connected in series circuit with said another winding of the respective regulating generator, said load exciter having a plurality of field windings including one winding responsive to the armature current of its associated roll motor and a differential winding responsive to its own output voltage, circuit means including a resistor connecting yet another of said field windings of each regulating generator in a differential sense across the main exciter associated with the respective roll motor, a damping transformer associated with each load exciter having one winding connected across the main exciter of the respective roll motor and another winding connected in series circuit with the differentially connected field winding of the respective load exciter, and switch means operable in response to operations of said control means to reduce the reference voltage to a minimum, said switch means being connected to shunt the resistor in circuit with the differential winding of each regulating generator and to shunt said another winding of the damping transformer of the respective load exciter.

3. A control system for a motor comprising, generator means connected to supply electrical energy to said motor including a regulating generator having a plurality of field windings, circuit means connecting one of said field windings to a source of adjustable reference voltage, a pilot generator connected in driving relation with the motor to produce a voltage proportional to the speed of the motor, additional circuit means connecting another of said field windings to the source and to the pilot generator in opposed senses, a load exciter connected in circuit with said another field winding, said load exciter having a plurality of excitation field windings, and a damper transformer having a primary winding energized in accordance with a control voltage responsive to the output of the regulating generator and a secondary winding connected in circuit relation with one of said load exciter field windings.

4. In a control system for an adjustable speed motor, a main generator connected to supply electrical energy to the motor, a regulating generator connected to regulate the output voltage of the main generator, said regulating generator having a plurality of field windings, circuit means connecting one of said field windings to a source of adjustable reference voltage, and additional circuit means connecting another of said field windings to said source and to a source of voltage variable with the speed of the motor in opposed senses.

5. A control system for an adjustable speed motor having an armature and a field winding, a pilot generator connected in driving relation with the motor and having a field winding, circuit means connected to effect energization of said field windings including means for adjusting the energization of the pilot generator field winding in proportion to that of the motor field winding, generator means individual to said motor connected to supply electrical energy to its armature, and a regulating generator connected to control the output voltage of said generator, said regulating generator having a basic excitation field winding disposed to be energized from a source of adjustable reference voltage, and a regulating field winding disposed to be energized from the pilot generator and the source in opposed senses.

6. In a control system for a plurality of adjustable speed motors disposed to be connected in driving relation with a common load, a main generator individual to each motor connected to supply electrical energy thereto, regulating means individual to each main generator including a regulating generator having a plurality of field windings, circuit means connecting one field winding of each regulating generator to a common source of adjustable reference voltage for determining the speed of its associated motor, a pilot generator individual to each motor connected to produce a voltage responsive to the speed of the motor, and circuit means connecting another one of the windings of each regulating generator to said source and to the pilot generator associated with the respective motor in opposed senses.

7. The combination with an adjustable speed motor having an armature and field winding, of a main generator individual to the motor, a regulating generator connected to control the output voltage of the main generator, said regulating generator having a plurality of field excitation means, circuit means connecting one of said field excitation means to be energized in accordance with a differential between an adjustable reference quantity and a voltage proportional to the speed of the motor, and control means connected in circuit with said circuit means and said one of the field excitation means operable to produce a voltage proportional to the armature current of the motor.

8. A control system for an adjustable speed motor comprising, generator means connected to supply electrical energy to the motor, an exciter connected to supply electrical energy to the generator, a regulating generator connected to supply electrical energy to the exciter, said regulating generator having a plurality of excitation field windings, circuit means connecting one of said windings to a source of adjustable reference voltage, a pilot generator disposed to produce a voltage proportional to the speed of the motor, additional circuit means connecting another of said windings to said source and to said pilot generator in opposed senses, and other circuit means connecting another of said field windings across the exciter to oppose said one winding connected to the reference source.

9. In a control system for a motor having an armature and a field winding, adjustable rheostat means connecting said field winding to a source of electrical energy, a pilot generator connected in driving relation with said motor and having a field winding, additional adjustable rheostat means connecting the field winding of the pilot generator to a source of electrical energy, said rheostat means being operatively connected together, a main generator connected to supply electrical energy to the motor armature and having a field winding, a main exciter having a field winding and an armature connected in circuit with the generator field winding, a regulating generator having an armature connected in circuit with the field winding of the main exciter and having a plurality of field windings, circuit means connecting one of said field windings to a source of adjustable reference voltage, additional circuit means connecting another of said field windings to said source and to the pilot generator in opposed senses, control means operable to vary the reference voltage, a load exciter connected in circuit with said another field winding and having a field winding, and circuit means including switch means operable in accordance with one operating position of said control means disposed to connect the field winding of the load exciter for different degrees of energization.

EDWIN L. HARDER.
LOREN F. STRINGER.
RAYMOND W. MOORE.
ROBERT I. GREENWOOD.

REFERENCES CITED

The following references are of record in the file of this patent:

UNITED STATES PATENTS

| Number | Name | Date |
|---|---|---|
| 1,060,208 | Osborne | Apr. 29, 1913 |
| 2,295,395 | Formhals | Sept. 8, 1942 |
| 2,399,918 | Garr et al. | May 7, 1946 |
| 2,437,973 | Schmitz | Mar. 16, 1948 |

FOREIGN PATENTS

| Number | Country | Date |
|---|---|---|
| 244,488 | Germany | Mar. 11, 1912 |